(12) United States Patent
Dewberry et al.

(10) Patent No.: US 6,507,425 B1
(45) Date of Patent: Jan. 14, 2003

(54) INFRARED COMMUNICATION SYSTEM

(75) Inventors: Brandon Scott Dewberry, Huntsville, AL (US); Kosta A. Varnavas, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/334,412

(22) Filed: Jun. 16, 1999

(51) Int. Cl.[7] .............................................. H04B 10/00
(52) U.S. Cl. ....................... 359/163; 359/158; 359/172; 395/500.18; 395/800
(58) Field of Search ................................ 359/163, 158, 359/172; 395/500.18, 800

(56) References Cited

U.S. PATENT DOCUMENTS

| | | | | |
|---|---|---|---|---|
| 5,204,555 A | * | 4/1993 | Graham et al. ............... | 326/46 |
| 5,857,109 A | * | 1/1999 | Taylor ......................... | 712/37 |
| 5,910,822 A | * | 6/1999 | Yamaguchi et al. ........ | 348/476 |
| 5,978,260 A | * | 11/1999 | Trimberger et al. ........ | 365/182 |
| 6,023,570 A | * | 2/2000 | Tang et al. ............ | 395/500.18 |
| 6,324,678 B1 | * | 11/2001 | Dangelo et al. ............... | 716/18 |
| 6,370,603 B1 | * | 4/2002 | Silverman et al. ............ | 710/72 |

* cited by examiner

Primary Examiner—Leslie Pascal
Assistant Examiner—Dzung Tran
(74) Attorney, Agent, or Firm—James J. McGroary

(57) ABSTRACT

An infrared communication system includes a reconfigurable RAM-based programmable logic device (PLD), an EPROM to provide configuration instructions to the PLD, and a clock supplying a clock signal to the PLD. A data input device and infrared transceiver are coupled to the PLD. The configured PLD uses the clock signal to synchronize data transfer between the data input device and the infrared transceiver.

10 Claims, 3 Drawing Sheets

INFRARED COMMUNICATION SYSTEM

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to infrared communication. More specifically, the invention is an infrared communication system that is easily tested and reconfigurable to work in a variety of applications.

2. Description of the Related Art

Infrared communication to and from remotely located devices is prevalent in many fields. Typically, infrared communication links are used to minimize disturbances along conventional interface wiring, to minimize the amount of physical bulk of conventional wiring, and/or to minimize electronics noise which can accompany other forms of wireless communication such as radio frequency (RF) communication. Accordingly, new and better infrared transceivers are constantly being made available.

In order to evaluate possible advantages of the latest infrared transceiver technology, it is desirable to test transmission/reception protocol with existing remotely-located devices. Ideally, such testing would be controlled from a user interface such as a personal computer. Further, the system for testing and/or controlling an infrared transceiver should be easily reconfigurable to adapt to the latest infrared transceiver technology.

SUMMARY OF THE INVENTION

Accordingly, it is an object of the present invention to provide an infrared communication system.

Another object of the present invention is to provide an reconfigurable infrared communication system.

Still another object of the present invention is to provide an infrared communication system that is easily tested.

Other objects and advantages of the present invention will become more obvious hereinafter in the specification and drawings.

In accordance with the present invention, an infrared communication system includes a RAM-based programmable logic device (PLD) having a configuration port over which configuration instructions are received. The RAM-based PLD further has first and second input/output (I/O) ports. An erasable programmable read only memory (EPROM) and/or a data input device is coupled to the configuration port to provide the configuration instructions at power up of the RAM-based PLD. A clock is coupled to the RAM-based PLD to supply a clock signal thereto. Another data input device is coupled to the first I/O port of the RAM-based PLD. An infrared transceiver is coupled to the second I/O port of the RAM-based PLD. The RAM-based PLD uses the clock signal to synchronize data transfer between the data input device coupled to the first I/O port and the infrared transceiver through the RAM-based PLD.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
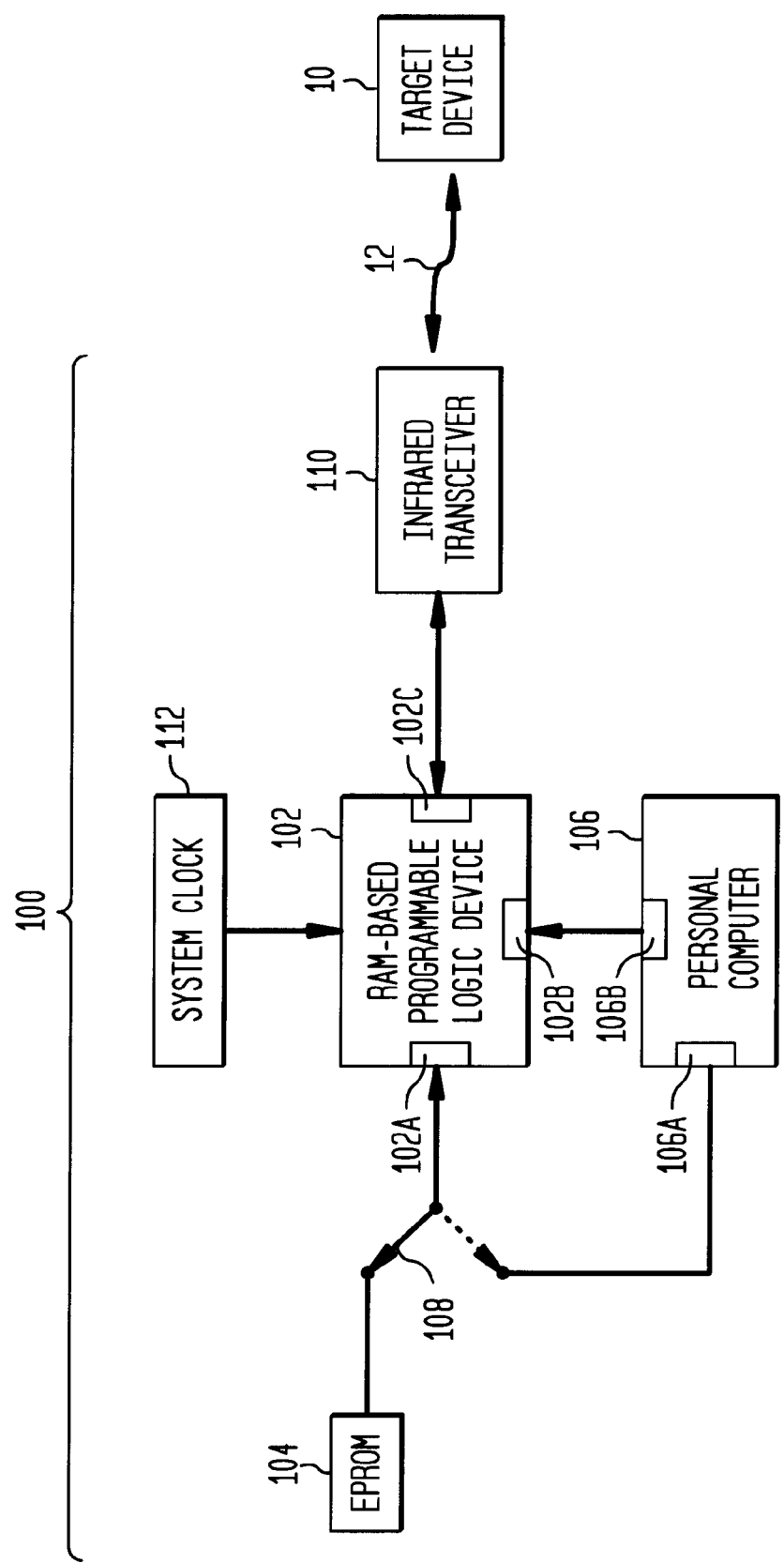
FIG. 1 is a top level block diagram of an infrared communication system according to the present invention.

Referring now to the drawings, and more particularly to FIG. 1, an infrared communication system is shown and referenced generally by numeral 100. Infrared communication system 100 can send/receive infrared transmissions 12 to and from a target device 10 or multiple target devices.

At the heart of infrared communications system 100 is a random access memory (RAM-based) programmable logic device (PLD) 102. RAM-based PLD 102 is a static random access memory device that is configured internally in accordance with prescribed hardware logic or configuration instructions each time it is powered up. The configuration instructions are passed to RAM-based PLD 102 over its configuration port 102A. Such RAM-based PLDs are known in the art and are available commercially from, for example, Altera Corporation, San Jose, Calif.; Actel Corporation, Sunnyvale, Calif.; and Lucent Technologies Inc., Murray Hill, N.J. The configuration instructions are preferably written in Very High Speed Integrated Circuit Hardware Description Language (VHDL) because VHDL is an industry standard PLD configuration language that is widely known and easy to modify.

The configuration instructions can be provided to RAM-based PLD 102 from a permanent memory such as an erasable programmable read only memory (EPROM) 104, from memory onboard a personal computer 106, or by manual input thereof using an input device such as personal computer 106. While only one source of configuration instructions will be used during the powering up of RAM-based PLD 102, several source options can be made a part of infrared communication system 100. Accordingly, a switch 108 can be provided to selectively couple either EPROM 104 or personal computer 106 to configuration port 102A. Note that the configuration instructions supplied (i.e., either stored or manually entered) by personal computer 106 are typically passed over a serial port 106A.

RAM-based PLD 102 has input/output (I/O) ports 102B and 102C for the transfer of data therethrough. Coupled to I/O port 102B is a data input device which, as mentioned above, can be the same personal computer 106 or a different dedicated personal computer. If personal computer 106 is used, I/O port 102B is typically coupled to another serial port 106B (e.g., RS-232 type) of personal computer 106. An infrared transceiver 110 is coupled to I/O port 102C. Data passing between personal computer 106 and infrared transceiver 110 is transformed, e.g., transcribed, converted in speed and form, undergoes protocol translation, etc., by RAM-based PLD 102. Since transmission/reception speeds of personal computer 106 and infrared transceiver 110 will generally be different, a system clock 112 is provided to supply a clock signal to RAM-based PLD 102. The clock signal will be manipulated as needed to suit a particular application as will be described further below.

Figure 2:
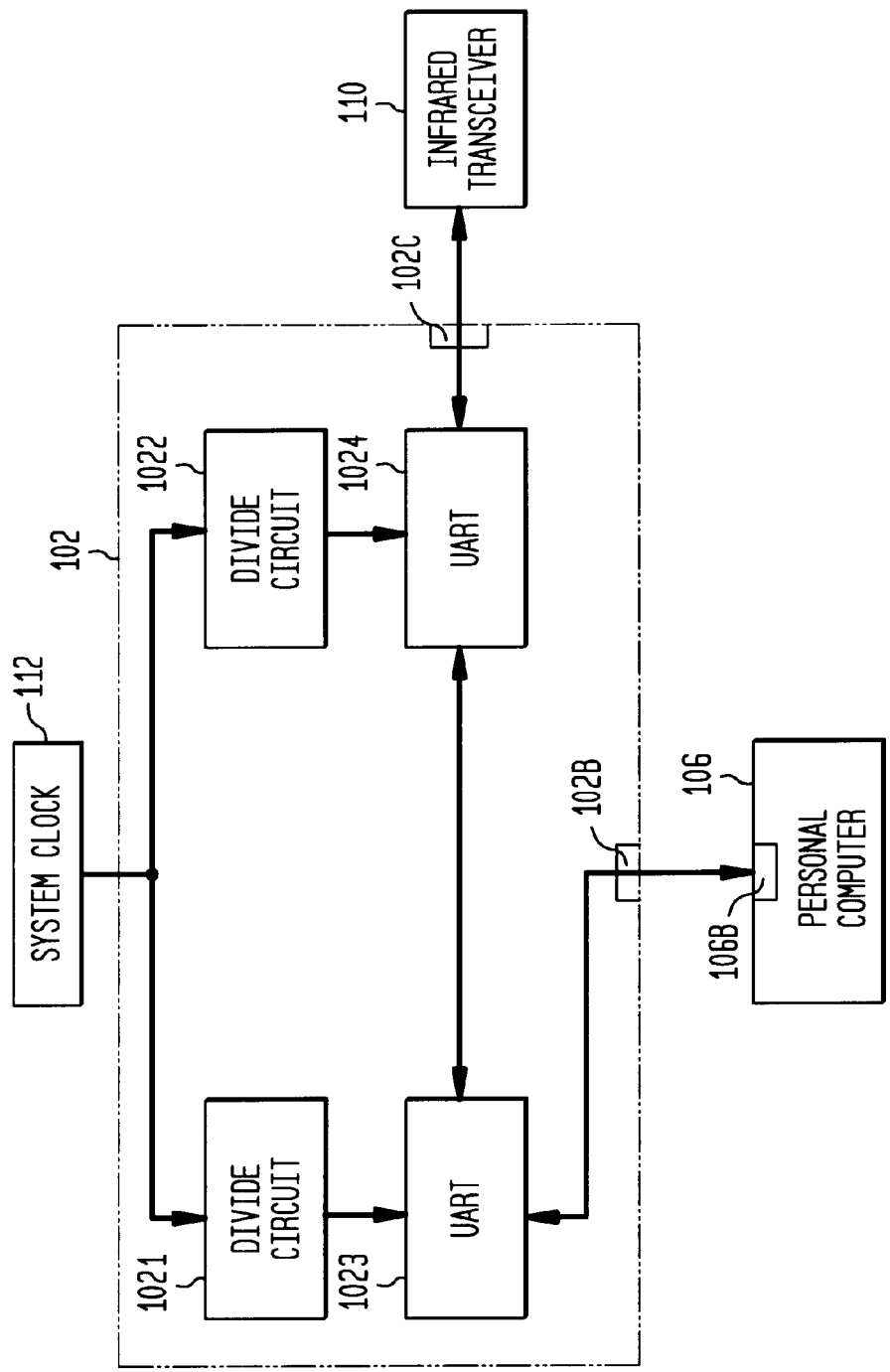
FIG. 2 is a block diagram of a RAM-based programmable logic device configured for use in the present invention.

FIG. 2 depicts a configuration of RAM-based PLD 102 at power up. First and second divide circuits 1021 and 1022 are configured to receive the clock signal produced by clock signal 112. For accurate asynchronous transmission, it is desirable to provide at least "8×" ("eight times") oversampling of data transferred from either personal computer 106 or infrared transceiver 110. Accordingly, divide circuits 1021 and 1022 are configured with a divisor to provide a clock signal that is at least eight times that of the data rates of personal computer 106 and infrared transceiver 110, respectively. So that only one system clock is required, system clock 112 has a clock speed that is at least eight times the greater of the data rates of personal computer 106 and infrared transceiver 110. For example, if serial port 106B is an RS-232 serial port with a data rate of 115.2 kilobits per second (kbs) and infrared transceiver 110 transfers data at a rate of 4 megabits per second (Mbs), system clock 112 would have to produce a clock signal at a minimum of 32 MHz. In such a case, the divisor of divide circuit 1021 would be 35 and the divisor of divide circuit 1022 would be 1.

The altered clock signals are passed to respective first and second universal asynchronous receiver/transmitter (UART) circuits 1023 and 1024. In general, the receiver portion of UART 1023 receives a serial (RS-232) data stream from personal computer 106 and stores same in order to form a parallel byte that is typically either 8, 16 or 32 bits in length. Each single parallel byte is passed to UART 1024 and reformatted to be suitable for infrared transmission by infrared transceiver 110. Conversely, the receiver portion of UART 1024 prepares the data from infrared transceiver 110 for reformatting to RS-232 format by the transmitter portion of UART 1023 prior to transmission to personal computer 106. Note that each of UART 1023 and UART 1024 can also be configured as an individual universal asynchronous receiver and an individual universal asynchronous transmitter as will be explained further below.

Figure 3:
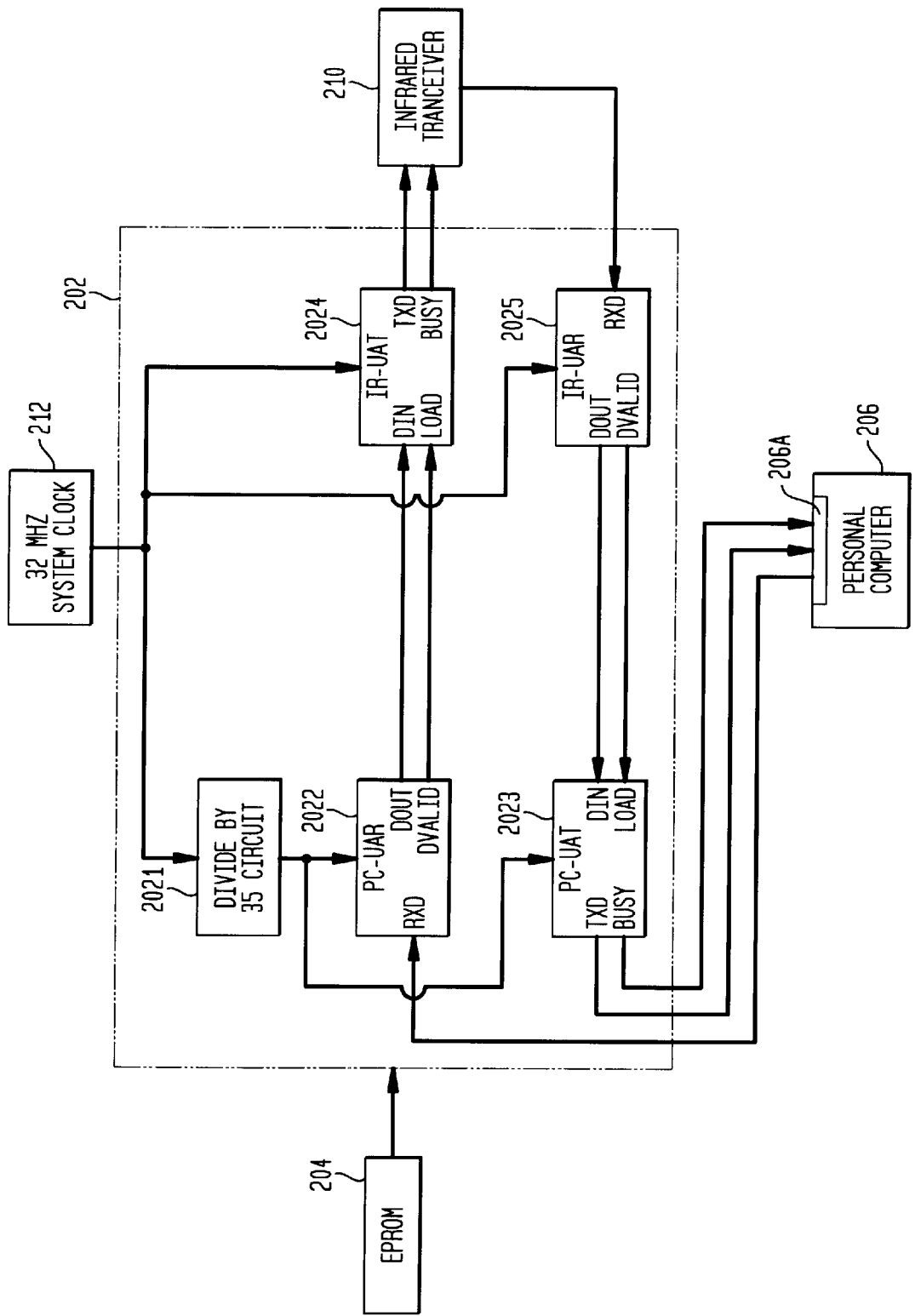
FIG. 3 is a block diagram of an embodiment of a RAM-based programmable logic device as it is configured to interface between an RS-232 serial port and a standard Infrared Developer's Association infrared transceiver operating at a speed of 4 megabits per second.

By way of illustrative example, a specific configuration of a RAM-based PLD in accordance with the present invention will be described. As illustrated in FIG. 3, data is transferred at the RS-232 serial rate of 115.2 kbs from a personal computer 206 to RAM-based PLD 202. An infrared transceiver 210 is assumed to be a standard Infrared Developer's Association (IRDA) transceiver module capable of transferring data at a rate of 4 Mbs. A system clock 212 provides a clock signal at 32 MHz. In this example, an EPROM 204 is used to supply the configuration instructions to RAM-based PLD 202.

Once configured, RAM-based PLD 202 defines a divide circuit 2021, a personal computer (PC) universal asynchronous receiver (UAR) 2022, a PC-universal asynchronous transmitter (UAT) 2023, an infrared (IR) universal asynchronous transmitter (UAT) 2024, and an IR-UAR 2025. In terms of data moving from personal computer 206 to infrared transceiver 210, divide circuit 2021 divides the clock signal from system clock 212 by 35 to produce a 921.6 kHz internal square wave clock, i.e., to accomplish "8×" oversampling by PC-UAR 2022 and PC-UAT 2023. PC-UAR 2022 receives each incoming 8-bit serial data byte on RXD from serial port 206A of personal computer 206 and converts same to a parallel byte on DOUT and pulses DVALID when the byte of data is valid. The parallel byte DOUT and pulse DVALID are passed to DIN and LOAD, respectively, of IR-UAT 2024. The 32 MHz clock signal from system clock 212 is fed directly to IR-UAT 2024 to serve as the "8×" oversampling clock. In response to inputs on DIN and LOAD, IR-UAT 2024 asserts BUSY, sends a start or synchronization pattern out at TXD, and clocks out the received parallel byte on TXD. The start or synchronization pattern can be a simple 3-bit pattern such as "110". The "11" pattern allows infrared transceiver 210 to charge up while the trailing "0" allows infrared transceiver 210 to synchronize itself on the 1 to 0 transition.

In terms of data moving from infrared transceiver 210 to personal computer 206, IR-UAR 2025 monitors its RXD input. Data received at RXD is clocked out at DOUT and the DVALID line is pulsed. In response, PC-UAT 2023 asserts BUSY, sends a start bit out at its TXD and follows this with the data clocked out serially at one-eighth the frequency of the clock signal received from divide circuit 2021.

The advantages of the present invention are numerous. Any type of target device using infrared transceiving can use the present invention for testing or as an integral interface with a remotely-located data input device, e.g., a personal computer. The RAM-based PLD is easily re-configured by one of a variety of easily-reprogrammed configuration sources, e.g., an EPROM, a personal computer, etc. The present invention is readily adaptable in terms of data transfer rates and protocol by simply changing the VHDL configuration instructions and, possibly, the system clock.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An infrared communication system, comprising:
   a RAM-based programmable logic device (PLD) having a configuration port over which configuration instructions are received, said RAM-based PLD further having a first input/output (I/O) port and a second I/O port;
   an erasable programmable read only memory (EPROM) coupled to said configuration port, said EPROM storing said configuration instructions;
   a system clock coupled to said RAM-based PLD for supplying a clock signal thereto;
   a data input device coupled to said first I/O port; and
   an infrared transceiver coupled to said second I/O port, wherein said RAM-based PLD uses said clock signal to synchronize data transfer between said data input device and said infrared transceiver through said RAM-based PLD,
   wherein said data input device has a first data transfer rate and said infrared transceiver has a second data transfer rate, and wherein said clock signal is at least eight times the greater of said first data transfer rate and said second data transfer rate, and
   wherein said RAM-based PLD configured with said configuration instructions comprises
      a first circuit coupled to said system clock for changing said clock signal to a first altered clock signal that is at least eight times said first data rate,
      a first universal asynchronous receiver/transmitter (UART) circuit coupled to said first circuit and said data input device, said first UART circuit passing data therethrough using said first altered clock signal,
      a second circuit coupled to said system clock for changing said clock signal to a second altered clock signal that is at least eight times said second data rate, and a second universal asynchronous receiver/transmitter (UART) circuit coupled to said second circuit, said infrared transceiver and said first UART circuit, said second UART circuit passing data therethrough using said second altered clock-signal.

2. An infrared communication system as in claim 1 wherein said data input device is a personal computer.

3. An infrared communication system as in claim 2 wherein said personal computer has a serial port and wherein said first I/O port is coupled to said serial port.

4. An infrared communication system as in claim 3 wherein said personal computer further has a second serial port, said personal computer further generating alternate configuration instructions for transmission via said second serial port and said infrared communication system further comprising a switch for coupling one of said EPROM and said second serial port of said personal computer to said configuration port, wherein one of said configuration instructions and said alternate configuration instructions is used to configure said RAM-based PLD.

5. An infrared communication system, comprising:
   a RAM-based programmable logic device (PLD) having a configuration port over which configuration instructions in Very High Speed Integrated Circuit Hardware Description Language (VHDL) are received, said RAM-based PLD further having a first input/output (I/O) port and a second I/O port;
   an erasable programmable read only memory (EPROM) coupled to said configuration port, said EPROM storing said configuration instructions;
   a system clock coupled to said RAM-based PLD for supplying a clock signal thereto;
   a personal computer having a serial port coupled to said first I/O port; and
   an infrared transceiver coupled to said second I/O port, wherein said RAM-based PLD uses said clock signal to synchronize data transfer between said personal computer and said infrared transceiver through said RAM-based PLD,
   wherein said serial port has a first data transfer rate and said infrared transceiver has a second data transfer rate, and wherein said clock signal is at least eight times the greater of said first data transfer rate and said second data transfer rate, and
   wherein said RAM-based PLD configured with said configuration instructions comprises
      a first circuit coupled to said system clock for changing said clock signal to a first altered clock signal that is at least eight times said first data rate,
      a first universal asynchronous receiver/transmitter (UART) circuit coupled to said first circuit and said serial port, said first UART circuit passing data therethrough using said first altered clock signal,
      a second circuit coupled to said system clock for changing said clock signal to a second altered clock signal that is at least eight times said second data rate, and
      a second universal asynchronous receiver/transmitter (UART) circuit coupled to said second circuit, said infrared transceiver and said first UART circuit, said second UART circuit passing data therethrough using said second altered clock signal.

6. An infrared communication system as in claim 5 wherein said personal computer further has a second serial port, said personal computer further generating alternate configuration instructions written in said VHDL for transmission via said second serial port, and said infrared communication system further comprising a switch for coupling one of said EPROM and said second serial port of said personal computer to said configuration port, wherein one of said configuration instructions and said alternate configuration instructions is used to configure said RAM-based PLD.

7. An infrared communication system, comprising:
   a RAM-based programmable logic device (PLD) having a configuration port over which configuration instructions in Very High Speed Integrated Circuit Hardware Description Language (VHDL) are received, said RAM-based PLD further having a first input/output (I/O) port and a second I/O port;
   a clock coupled to said RAM-based PLD for supplying a clock signal thereto;
   a personal computer having a serial port operating at a first data transfer rate, said serial port coupled to said first I/O port;
   an infrared transceiver operating at a second data transfer rate, said infrared transceiver coupled to said second I/O port, wherein said RAM-based PLD uses said clock signal to synchronize data transfer between said personal computer and said infrared transceiver through said RAM-based PLD; and
   means coupled to said configuration port for supplying said configuration instructions to said RAM-based PLD, wherein said RAM-based PLD is configured by said configuration instructions to include:
      i) a first circuit coupled to said system clock for changing said clock signal to a first altered clock signal that is at least eight times said first data rate,
      ii) a first universal asynchronous receiver/transmitter (UART) circuit coupled to said first circuit and said serial port, said first UART circuit passing data therethrough using said first altered clock signal,
      iii) a second circuit coupled to said system clock for changing said clock signal to a second altered clock signal that is at least eight times said second data rate, and
      iv) a second universal asynchronous receiver/transmitter (UART) circuit coupled to said second circuit, said infrared transceiver and said first UART circuit, said second UART circuit passing data therethrough using said second altered clock signal.

8. An infrared communication system as in claim 7 wherein said means is an erasable programmable read only memory (EPROM) storing said configuration instructions.

9. An infrared communication system as in claim 7 wherein said means is a second personal computer supplying said configuration instructions.

10. An infrared communication system as in claim 7 wherein said means is said personal computer supplying said configuration instructions to said RAM-based PLD using a second serial port of said personal computer.

* * * * *